US011592139B2

(12) United States Patent
Warwick

(10) Patent No.: US 11,592,139 B2
(45) Date of Patent: Feb. 28, 2023

(54) EQUIPMENT MOUNTING ASSEMBLY

(71) Applicant: David S. Warwick, Mounds View, MN (US)

(72) Inventor: David S. Warwick, Mounds View, MN (US)

( * ) Notice: Subject to any disclaimer, the term of this patent is extended or adjusted under 35 U.S.C. 154(b) by 0 days.

(21) Appl. No.: 17/343,023

(22) Filed: Jun. 9, 2021

(65) Prior Publication Data

US 2021/0396346 A1  Dec. 23, 2021

Related U.S. Application Data

(60) Provisional application No. 63/040,892, filed on Jun. 18, 2020.

(51) Int. Cl.
*F16M 11/20* (2006.01)
*E05C 1/06* (2006.01)

(52) U.S. Cl.
CPC ......... *F16M 11/2014* (2013.01); *E05C 1/065* (2013.01); *F16M 11/2092* (2013.01); *F16M 2200/04* (2013.01); *F16M 2200/065* (2013.01); *F16M 2200/08* (2013.01)

(58) Field of Classification Search
CPC ........... F16M 11/2014; F16M 11/2092; F16M 2200/04; F16M 2200/065; F16M 2200/08; F16M 2200/021; F16M 2200/022; F16M 2200/024; E05C 1/065; G03B 17/561; G03B 17/56; F16C 11/10
USPC .............................. 248/123.11, 123.2, 125.9
See application file for complete search history.

(56) References Cited

U.S. PATENT DOCUMENTS 1,319,792 A * 10/1919 Phorson ................. F16M 11/04
  248/326
1,942,925 A * 1/1934 Elliott ...................... H04R 1/08
  381/362
2,327,852 A * 8/1943 Batchelder .......... F16H 57/0025
  403/52

(Continued)

OTHER PUBLICATIONS

Altron Communications Equipment, "SB1-RM Roof Mounted Swivel Arm Bracket", https://www.altron.co.uk/res/Swivel%20Arm%20Brackets-Domes.pdf, retrieved from internet on Dec. 12, 2021, 1 page.

(Continued)

*Primary Examiner* — Christopher Garft
(74) *Attorney, Agent, or Firm* — Mueting Raasch Group

(57) ABSTRACT

A mounting assembly includes a base; a post extending from the base, the post defining a vertical axis; a beam mounted on the post and being pivotable about the vertical axis, the beam comprising a first portion extending in a first horizontal direction and terminating in a first end, and a second portion extending in a second horizontal direction opposite of the first direction and terminating in a second end; an equipment mounting bracket at the first end; a latch along the beam and having an engaged position and release position, wherein in the engaged position the latch prevents the beam from pivoting; and a latch release along the second portion of the beam. A method of accessing equipment mounted on the mounting assembly includes actuating the latch release such that the latch moves from the engaged position to the release position; and rotating the beam about the vertical axis.

21 Claims, 19 Drawing Sheets

(56) References Cited

U.S. PATENT DOCUMENTS

| | | | | |
|---|---|---|---|---|
| 2,479,720 | A | * | 8/1949 | Brandt .................... G03B 15/07 |
| | | | | 248/123.2 |
| 4,969,625 | A | * | 11/1990 | Singer ................... B25H 1/0028 |
| | | | | 248/123.2 |
| 5,129,397 | A | * | 7/1992 | Jingu ....................... A61B 8/00 |
| | | | | 600/437 |
| 5,139,220 | A | * | 8/1992 | Leonian ............... F16M 11/245 |
| | | | | 248/124.2 |
| 5,751,548 | A | * | 5/1998 | Hall .................... F16M 11/2064 |
| | | | | 361/679.41 |
| 6,877,811 | B1 | * | 4/2005 | Garelick ................... A47C 3/18 |
| | | | | 297/344.22 |
| 7,434,772 | B1 | * | 10/2008 | Jou ....................... F26B 21/001 |
| | | | | 248/124.2 |
| 2004/0079849 | A1 | * | 4/2004 | Rudolf ................... F16M 11/14 |
| | | | | 248/917 |
| 2008/0100707 | A1 | | 5/2008 | Brown |
| 2020/0240584 | A1 | * | 7/2020 | Priola .................. F16M 13/022 |
| 2022/0074542 | A1 | * | 3/2022 | Priola .................. F16M 13/027 |

OTHER PUBLICATIONS

Baird Mounting Systems, "B4-6X6DRB, 2.88"OD-X' MAST & 60" Camera Arm W/ Adapter PLT", https://www.bairdmounts.com/documents/support/B46DRB288X3CA60AXIS_SH_60973BD5B67AB.PDF, Apr. 28, 2015, 2 pages.

* cited by examiner

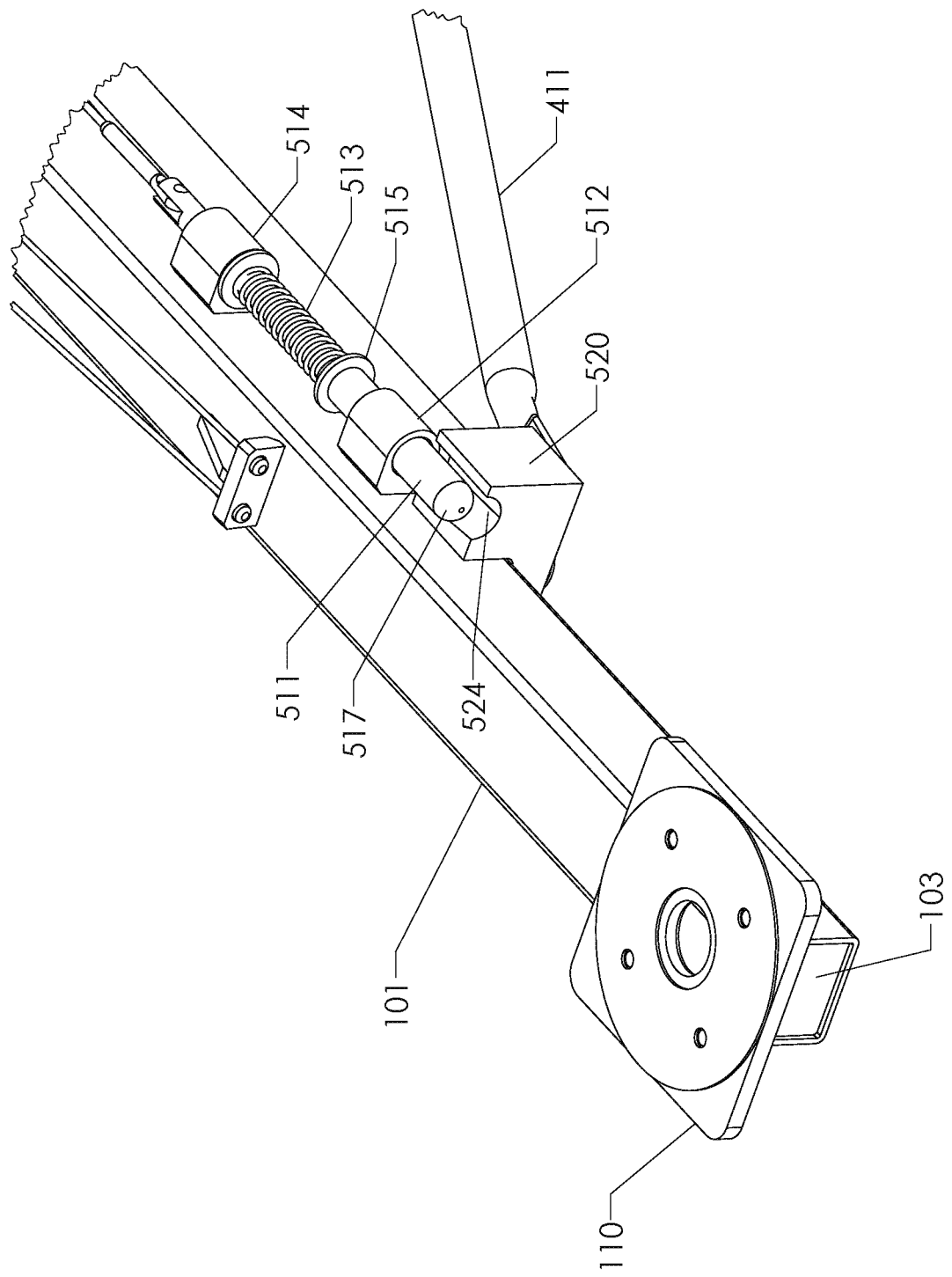

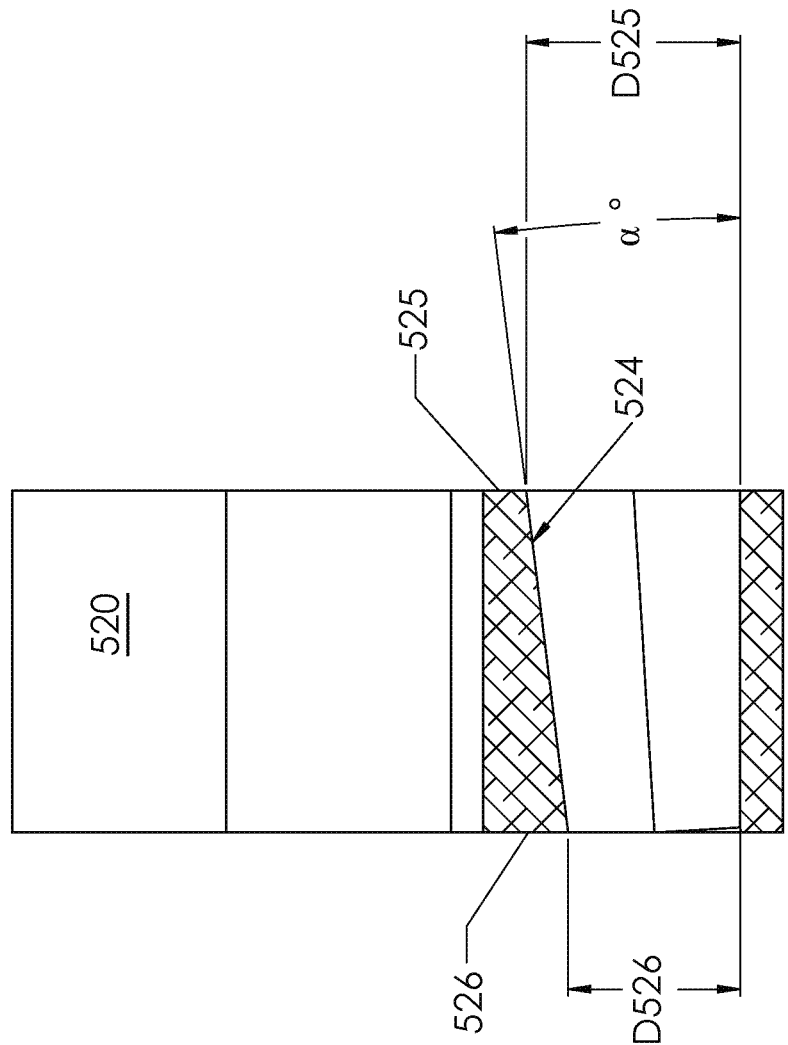
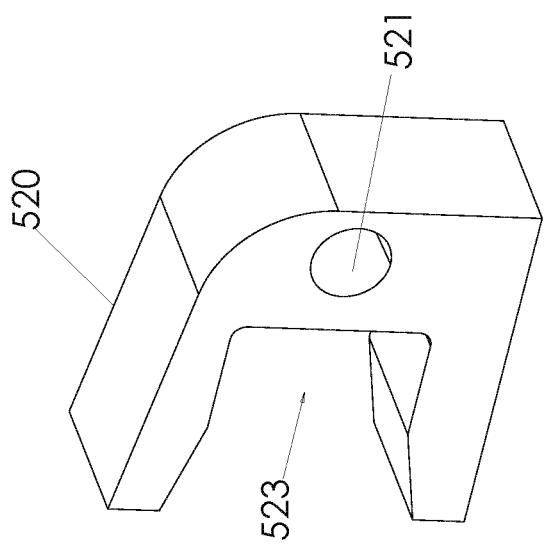
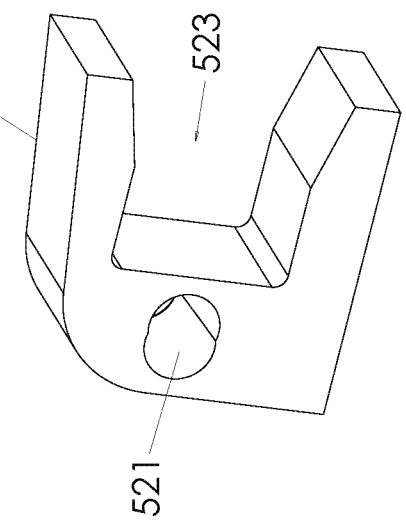

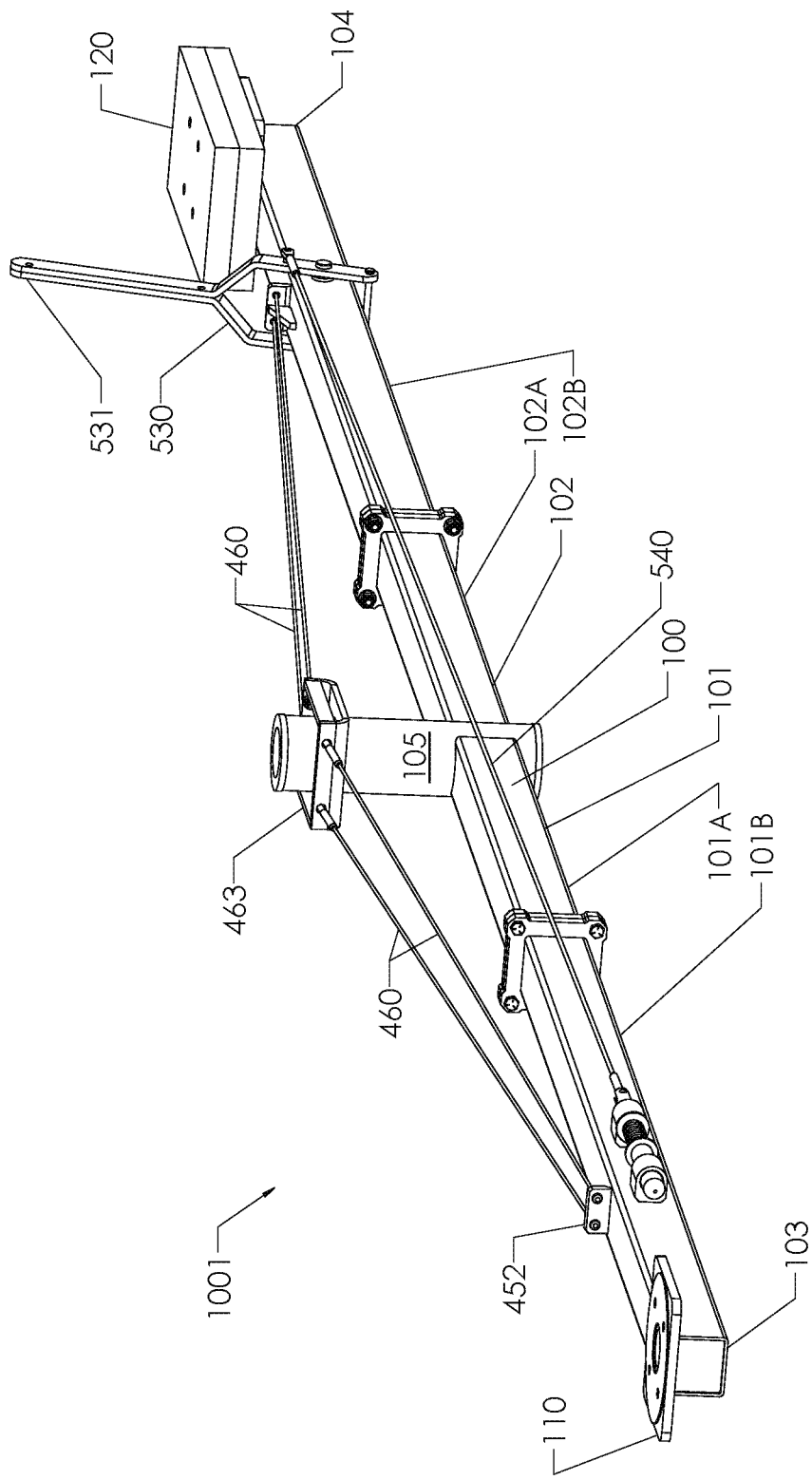

EQUIPMENT MOUNTING ASSEMBLY

CROSS-REFERENCE TO RELATED APPLICATIONS

The present application claims priority to U.S. Provisional Application No. 63/040,892, filed on Jun. 18, 2020, which is incorporated herein by reference in its entirety.

FIELD

The present disclosure generally relates to equipment mounting systems. The present disclosure further relates to mounting systems configured to mount equipment, such as security cameras on rooftops.

BACKGROUND

Equipment, such as security cameras, lights, etc., may be mounted on rooftops for convenience. In order to reach over areas adjacent buildings, such equipment is typically mounted at the very edge of the roof. However, mounting and servicing such equipment provides unique challenges, particularly when mounted on a flat rooftop. Flat rooftops are susceptible to leaks, and penetration of the rooftop surface material is not desired. Further, while flat rooftops may be easily accessed, the need to mount equipment near or on the edge of the roof poses safety concerns when the equipment is being mounted or serviced.

Existing rooftop mounting systems are subject to flexing and vibrations, which may be problematic with the use of a security camera. Existing systems may also risk puncturing or wearing out the rooftop surface material due to non-ideal weight distribution. Further, existing systems with a pivoting mounting arm may still require service personnel to reach areas at or near the edge of the roof to be able to release and/or pivot the mounting arm to a service position.

There is a need for a mounting assembly that can be mounted on flat rooftops without perforating, puncturing, or otherwise damaging the rooftop surface material. There is further a need for a mounting assembly that can be used to mount equipment at, near, or even over the edge of a rooftop while allowing the mounted equipment to be positioned for safe servicing.

SUMMARY

A mounting assembly includes a base; a post extending from the base, the post defining a vertical axis; a beam mounted on the post and being pivotable about the vertical axis, the beam comprising a first portion extending in a first horizontal direction from the post and terminating in a first end, and a second portion extending in a second horizontal direction opposite of the first direction and terminating in a second end; an equipment mounting bracket at the first end; a latch along the beam, the latch having an engaged position and a release position, wherein in the engaged position the latch prevents the beam from pivoting; and a latch release along the second portion of the beam.

A method of accessing equipment mounted on the mounting assembly includes actuating the latch release such that the latch moves from the engaged position to the release position; and rotating the beam about the vertical axis.

BRIEF DESCRIPTION OF DRAWINGS

FIGS. 4D and 4E are partial cut-off views of the latch of the mounting assembly of FIG. 4A.

FIGS. 5A and 5B are detail views of a latch block of the mounting assembly of FIG. 1 according to an embodiment.

FIG. 5C is a cross-sectional top view of the latch block of FIG. 5A.

FIG. 8 is a perspective view of a beam assembly of the mounting assembly of FIG. 1A according to an embodiment.

DETAILED DESCRIPTION

Figure 1A:
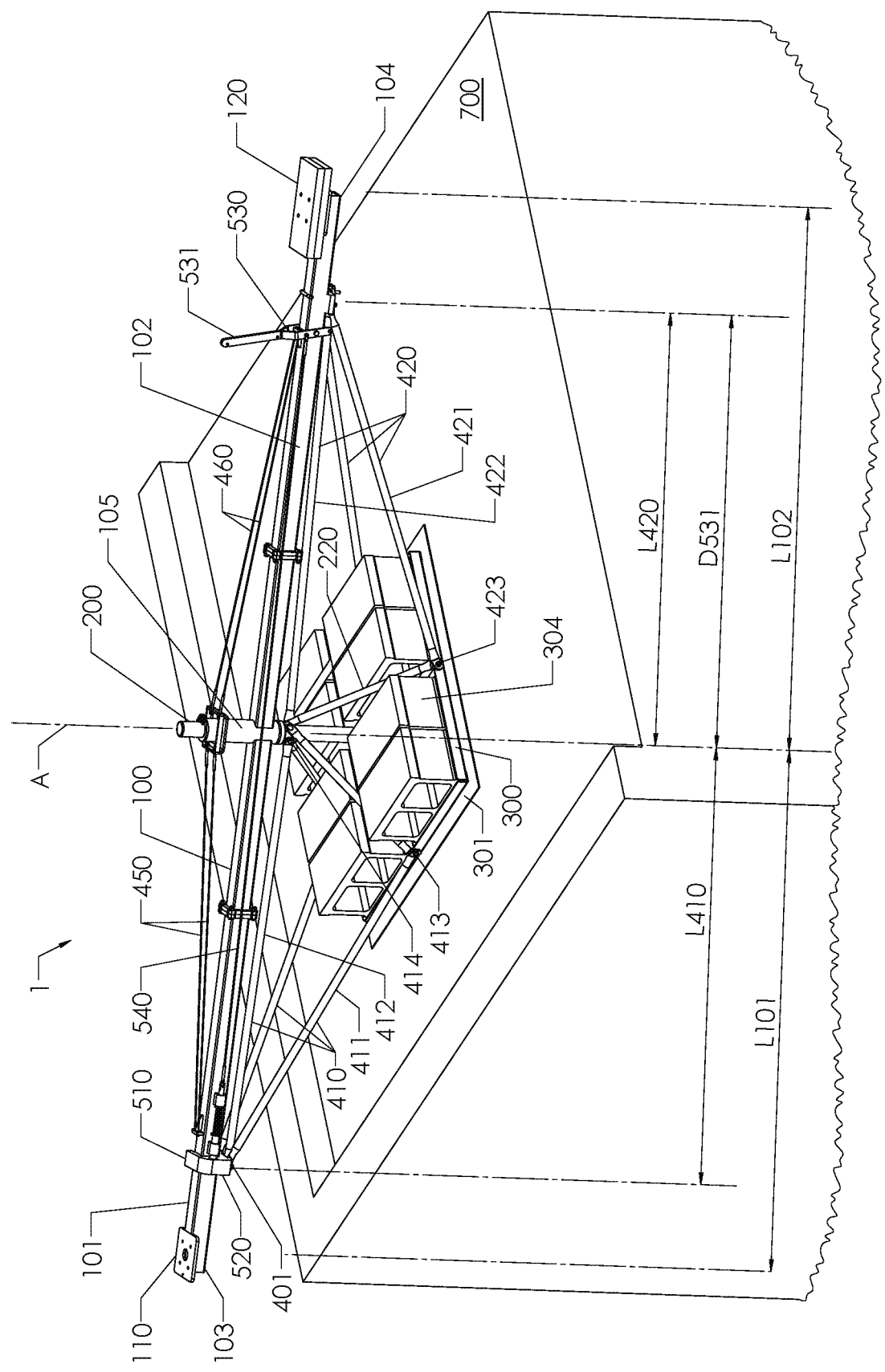
FIG. 1A is a perspective view of a mounting assembly according to an embodiment.
Figure 1B:
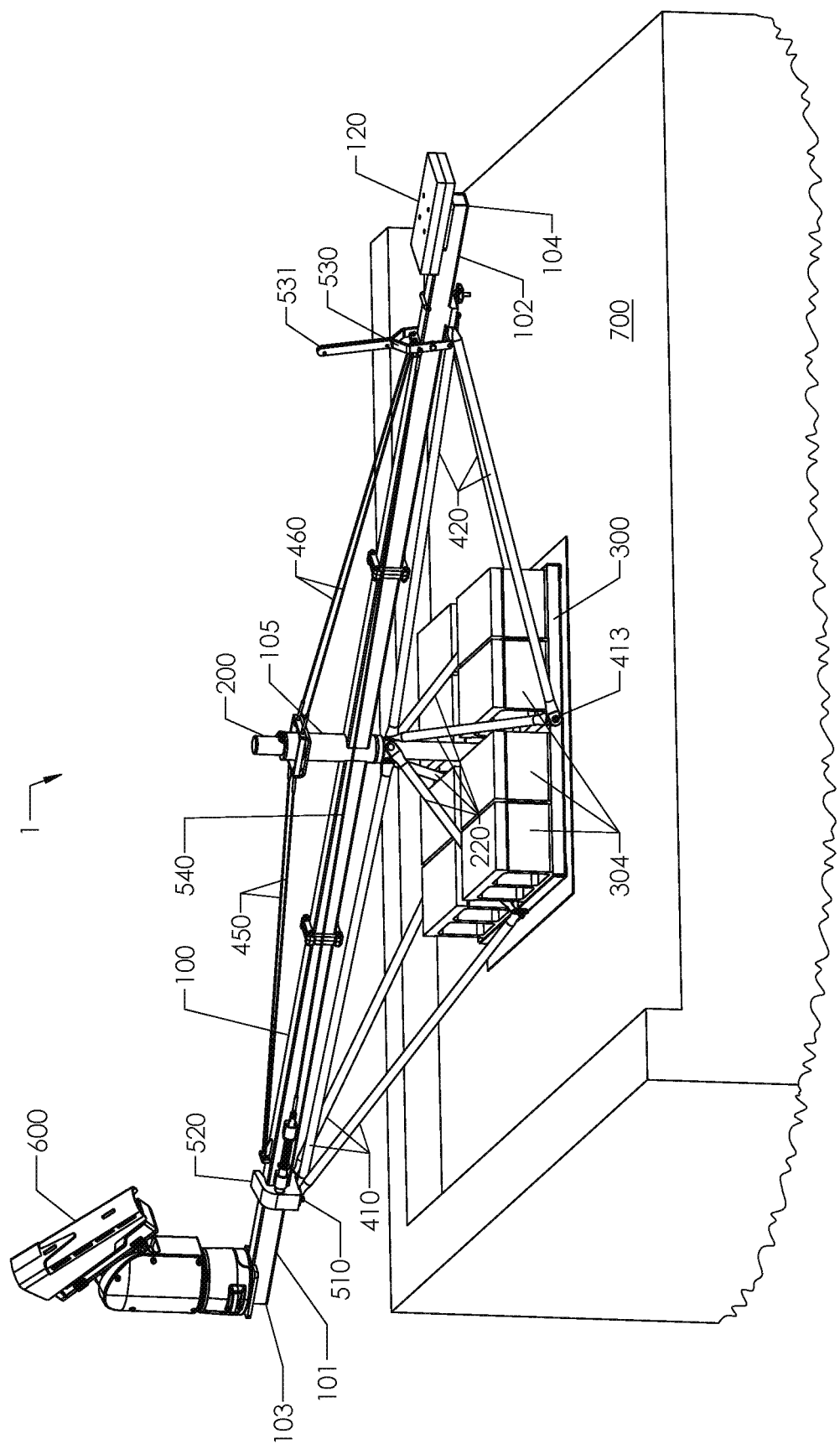
FIG. 1B is a perspective view of the mounting assembly of FIG. 1A with a camera according to an embodiment.
Figure 1C:
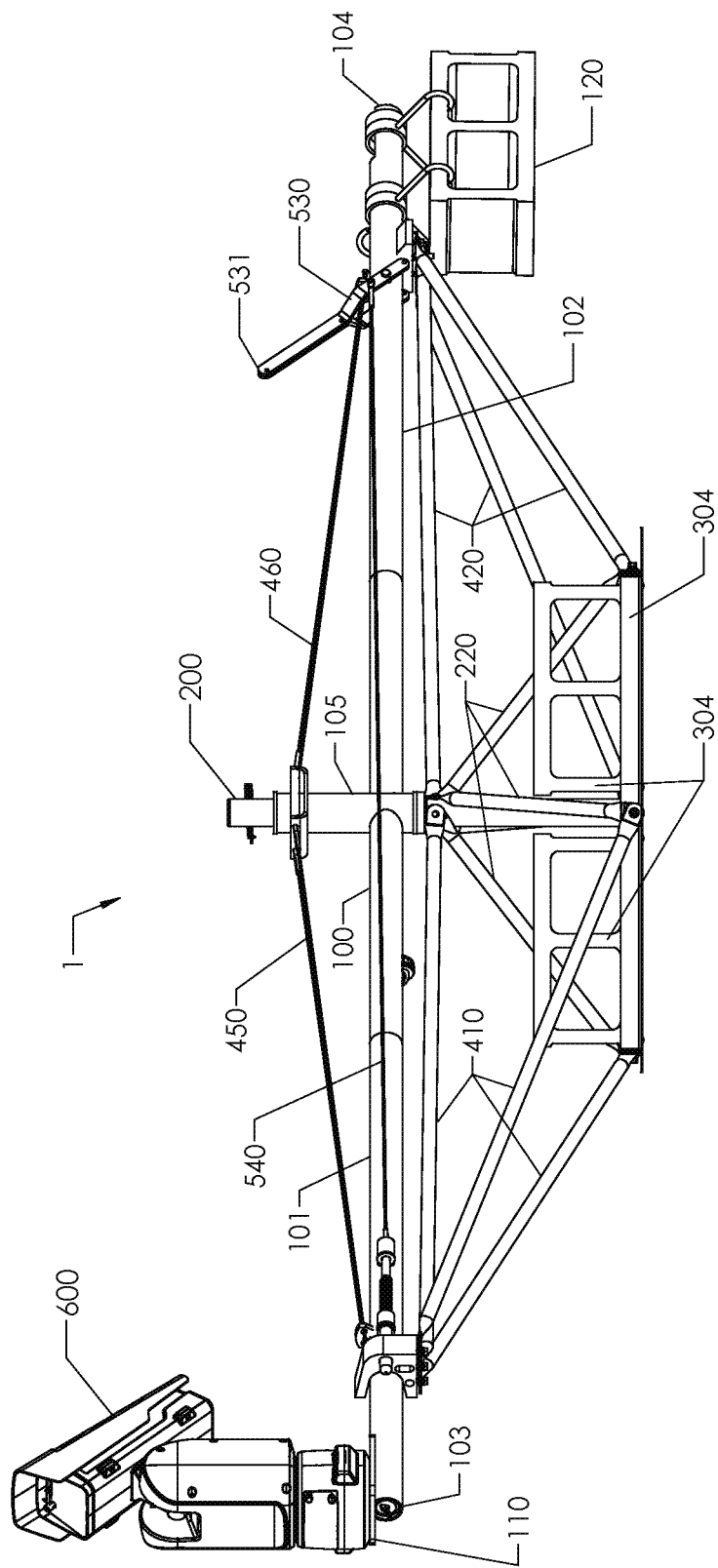
FIG. 1C is a side view of a mounting assembly according to an embodiment.
Figure 1D:
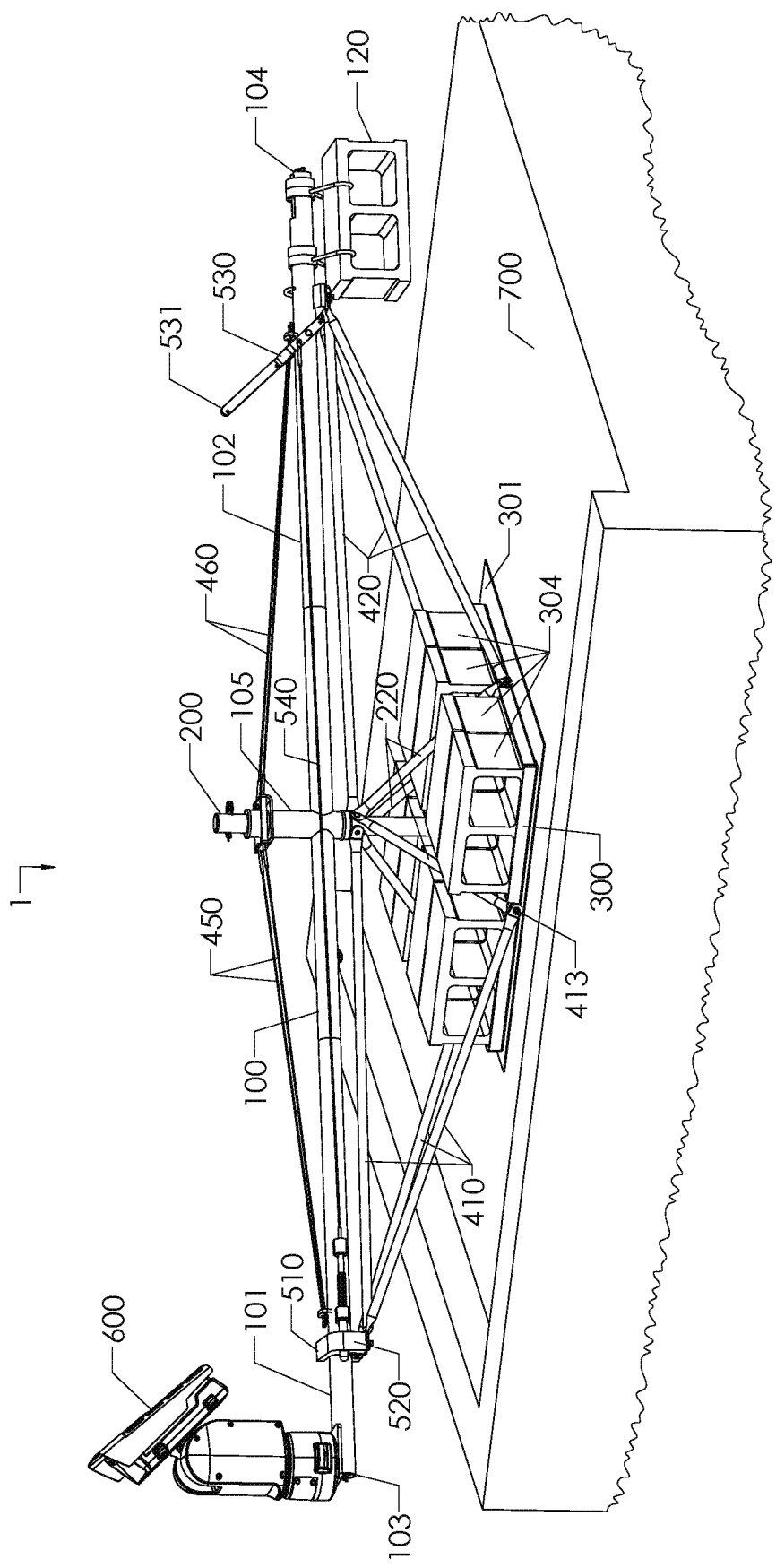
FIG. 1D is a perspective view of the mounting assembly of FIG. 1C with a camera according to an embodiment.
Figure 1E:
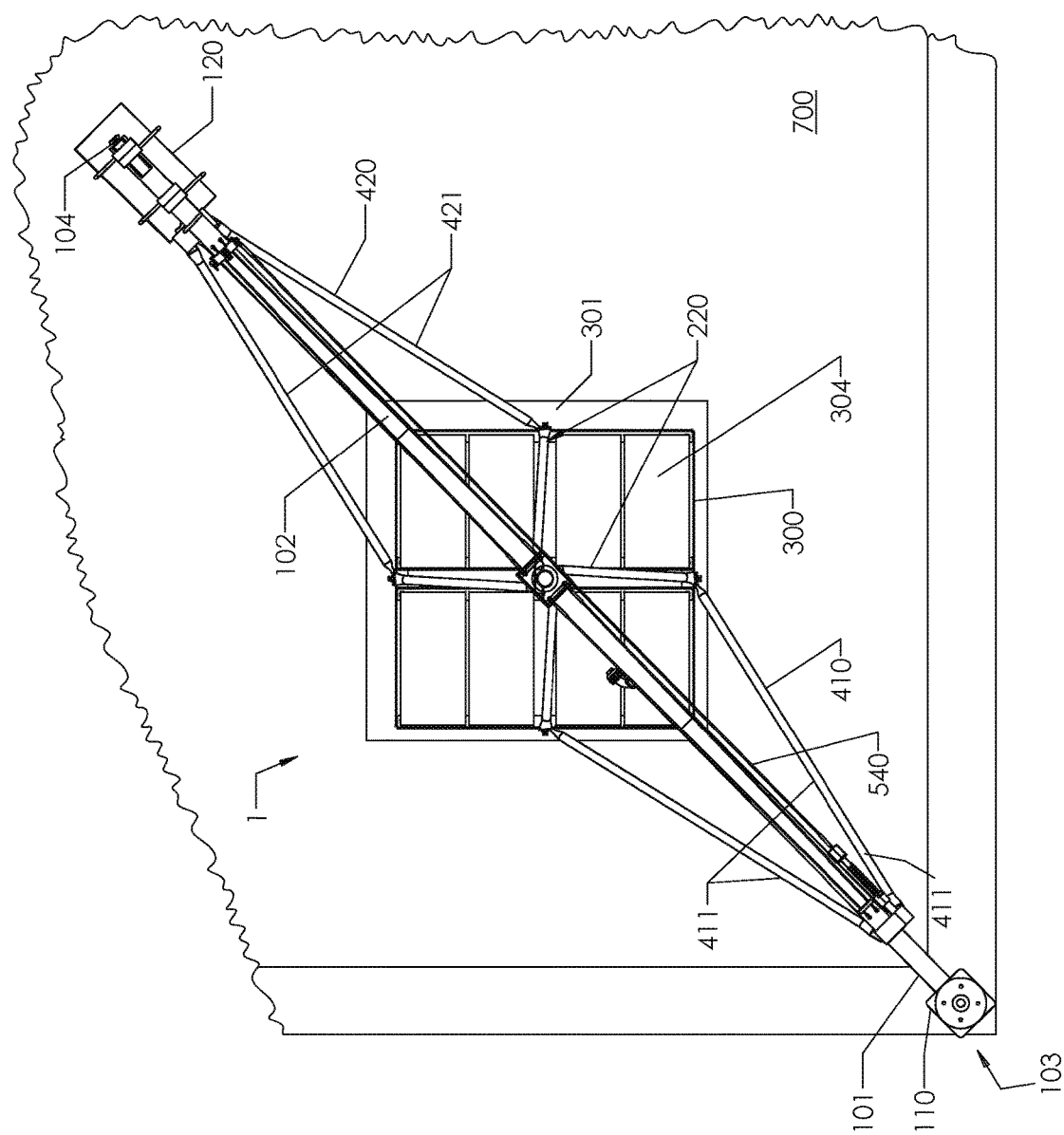
FIG. 1E is a top view of the mounting assembly of FIG. 1C according to an embodiment.

The present disclosure relates to generally relates to equipment mounting systems. The present disclosure further relates to mounting assemblies configured to mount equipment, such as security cameras on rooftops. The mounting assembly includes a pivotable beam with a deployed position and a service position.

The term "substantially" as used here has the same meaning as "significantly," and can be understood to modify the term that follows by at least about 75%, at least about 90%, at least about 95%, or at least about 98%. The term "not substantially" as used here has the same meaning as "not significantly," and can be understood to have the inverse meaning of "substantially," i.e., modifying the term that follows by not more than 25%, not more than 10%, not more than 5%, or not more than 2%.

The term "about" is used here in conjunction with numeric values to include normal variations in measurements as expected by persons skilled in the art, and is understood have the same meaning as "approximately" and to cover a typical margin of error, such as ±5% of the stated value.

Terms such as "a," "an," and "the" are not intended to refer to only a singular entity, but include the general class of which a specific example may be used for illustration.

The terms "a," "an," and "the" are used interchangeably with the term "at least one." The phrases "at least one of" and "comprises at least one of" followed by a list refers to any one of the items in the list and any combination of two or more items in the list.

As used here, the term "or" is generally employed in its usual sense including "and/or" unless the content clearly dictates otherwise. The term "and/or" means one or all of the listed elements or a combination of any two or more of the listed elements.

The recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" or "at least" a particular value, that value is included within the range.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

In the United States, the Occupational Safety and Health Administration (OSHA) regulates work in dangerous conditions, such as working on an unprotected roof. For work that is temporary and infrequent, a designated work area may be established that is no less than 6 feet (about 1.8 m) from the roof edge (OSHA Standard 1910.29(d)). It is thus desirable to provide a mounting assembly that can be operated and serviced at a distance of at least 6 feet from a roof edge when the equipment is mounted at, near, or even over the roof edge. The work from a safe distance includes releasing a latch or other fastening device used to maintain the equipment in a deployed position.

When equipment is mounted on a roof, it is typically undesired to penetrate the surface material of the roof. This means that the assembly cannot be bolted down to the roof structure to provide stability. Modern security cameras can be quite heavy. Mounting heavy equipment at the end of a long beam that allows work from a sufficient distance from the edge but that is not secured to the roof presents certain challenges to the design of the mounting assembly. It is desirable that the mounting assembly does not tip over or flex even under severe weather conditions. It is also desirable that the security camera can be held in place without shaking or vibration from wind in order to obtain high quality imaging from the camera.

According to some embodiments, the mounting assembly is constructed for being mounted on a rooftop, such as a flat roof. The mounting assembly includes a base and a post extending from the base. The post may define a vertical axis extending along the length of the post. A beam is mounted on the post and is pivotable about the vertical axis. The beam includes a first portion that extends in a first horizontal direction from the post and terminates in a first end, and a second portion that extends in a second horizontal direction opposite of the first horizontal direction and terminates in a second end. An equipment mounting bracket is provided at the first end of the beam. The assembly further includes a remotely operable latch along the beam (e.g., along the first portion of the beam), and a latch release along the second portion of the beam. The latch has an engaged position and a release position such that in the engaged position the latch prevents the beam from pivoting about the vertical axis.

The remotely operable (e.g., releasable) latch allows the beam to be released from its deployed position and rotated to a maintenance position such that the equipment mounted on the equipment mounting bracket can be safely serviced without any person needing to approach the edge of the roof. In preferred embodiments, both releasing the latch and servicing the equipment can be done from a distance of 6 ft (about 1.8 m) or greater from a roof edge when the assembly is mounted sufficiently close to the roof edge so that, when the equipment is in the deployed position and the latch is engaged, the equipment is positioned at or over the roof edge. Further in preferred embodiments, the mounting edge. Further in preferred embodiments, the mounting assembly is supported and balanced so that when the equipment is in the deployed position and the latch is engaged, vibration of the equipment is minimized.

According to an embodiment, the weight of the mounting assembly is distributed on the roof surface so that no more than 1.6 pounds per square inch or no more than 1.4 pounds per square inch pressure is applied to any point of the roof. The mounting assembly base may be placed on a rubberized mat to further distribute the load and to protect roofing materials.

Referring now to FIGS. 1A-1E, a mounting assembly 1 assembled on a rooftop 700 is show according to an embodiment. The mounting assembly 1 may be installed (e.g., assembled) on the rooftop 700 without penetrating the surface of the rooftop. That is, the mounting assembly 1 may be installed without fastening the mounting assembly to the roof.

The mounting assembly 1 includes a base 300 that is weighted down by a ballast 304. The base 300 may include a frame, lip, or other structures that enable convenient placement of the ballast 304 and connection of support structures. The ballast 304 is preferably substantially evenly distributed over at least 25%, at least 40%, at least 60%, at least 75%, or at least 90% of the surface of the base 300. The base 300 may include a mat 301, e.g., a rubberized mat, placed under the base 300 to further protect the roof surface. The mass of the ballast 304 is selected based on various factors, such as the mass of the equipment being mounted and the dynamic load on the structure applied by high winds and precipitation. In an exemplary embodiment, the mass of the ballast 304 may be about 300 to 400 pounds (about 140 to 180 kg). For smaller or larger systems, the ballast may be lighter or heavier, respectively. For ease of installation, the ballast 304 can be separate from the base 300. For example, the ballast 304 may be made up of a plurality of suitably sized and weighted units. In some cases, concrete masonry units, such as cinder blocks, may be conveniently used. Alternatively, the ballast 304 may be integral with the base 300.

An upright post 200 extends from the base 300. The post 200 defines a vertical axis A extending along the length of the post 200. The post 200 may be positioned at the center (e.g., a calculated geometric center) of the base 300. The post 200 may be supported by post supports 220 that are attached to the post 200 and to the base 300.

A long beam 100 is mounted on the post 200. According to an embodiment, the beam 100 is substantially horizontal and perpendicular to the vertical axis A. The beam may be mounted on the post with a sleeve 105 that at least partially surrounds the post 200 and allows the beam to rotate about the vertical axis A. The beam 100 has a first portion 101, extending from the post (or the sleeve) in a first horizontal direction to a first end 103 which may also be called the equipment mounting end. An equipment mounting bracket 110 may be disposed at the first end 103. The equipment mounting bracket 110 is shown as a plate. However, other shapes and configurations are possible, as the equipment mounting bracket 110 can be selected based on the equipment being mounted. The length L101 of the first portion 101 is selected so that the mounting assembly 1 can be mounted and the equipment placed in a desired location near an edge of the roof, and that the equipment can be safely operated and serviced from a distance of 6 ft (about 1.8 m) or greater from the roof edge. The beam 100 may be constructed from multiple sections as shown in FIGS. 1A and 8.

The beam 100 may also have a second portion 102, extending in the opposite direction of the first portion 101 (in a second horizontal direction). The second portion 102 extends from the post (or the sleeve) to a second end 104 which may also be referred to as the counterweight end. A counterweight mount 120 (shown as a plate in FIGS. 1A and 1B) may be disposed at the second end 104. Alternatively, a counterweight may simply be attached to the second end 104 by a suitable attachment mechanism, such as the hanger system shown in FIGS. 1C-1E. The length L102 of the second portion 102 and the mass of the counterweight are selected such that the counterweight balances or substantially balances the weight of the equipment mounted at the equipment mounting end. For example, if the weight of the equipment mounted on the first end were 40 lbs, the counterweight may be selected to be no less than 30 lbs. The counterweight may weigh approximately the same as the equipment, or in the exemplary case, from about 30 to 40 lbs. The length L102 is also selected so that the equipment can be safely operated and serviced from a distance of 6 ft (about 1.8 m) or greater from the roof edge. In some cases the length L102 of the second portion 102 is the same or substantially the same as the length L101 of the first portion 101.

The beam 100 (e.g., first portion 101 and second portion 102), the sleeve 105, and the latch assembly 500 may be provided as an assembled unit, the beam assembly 1001, shown in FIG. 8. The first and second portions 101, 102 of the beam 100 may be fixed (e.g., welded) onto the sleeve 105. The first and second portions 101, 102 may be made from sections, such as first section 101A and second section 101B of the first portion 101, and first section 102A and second section 102B of the second portion 102. The sections may be connected by any suitable mechanism, such as by using welded flanges and fasteners (e.g., screws and bolts), as shown, or by any other suitable mechanism. Alternatively, any or all of the portions of the beam and the sleeve may be integrally formed. The center bracket 463 may also be welded onto the sleeve 105 or may be attached by another mechanism.

Figure 3:
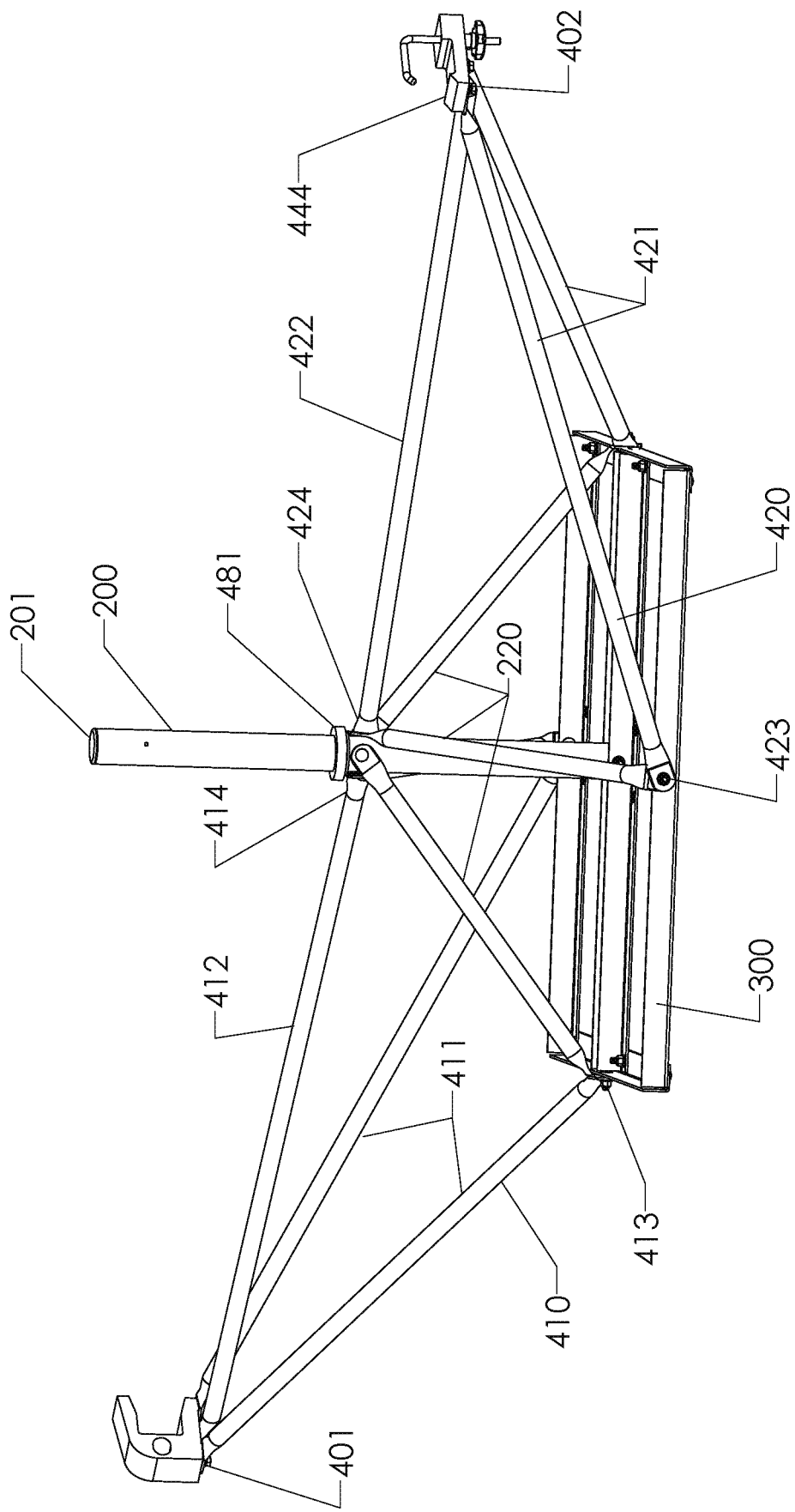
FIG. 3 is a perspective view of a base, post, and support frame of the mounting assembly of FIG. 1A according to an embodiment.
Figure 4A:
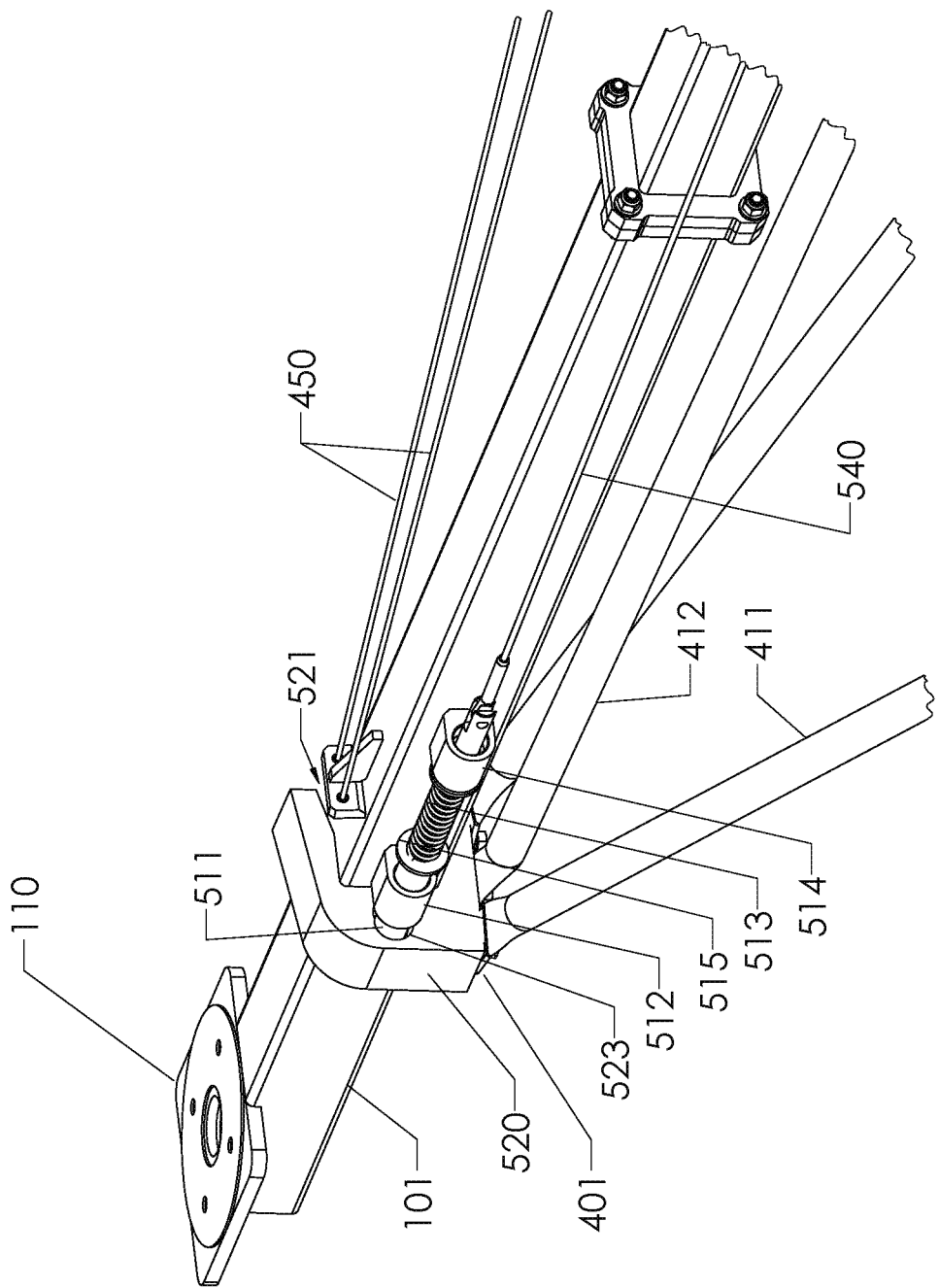
FIGS. 4A-4C are detail views of a latch of the mounting assembly of FIG. 1A according to an embodiment.
Figure 4B:
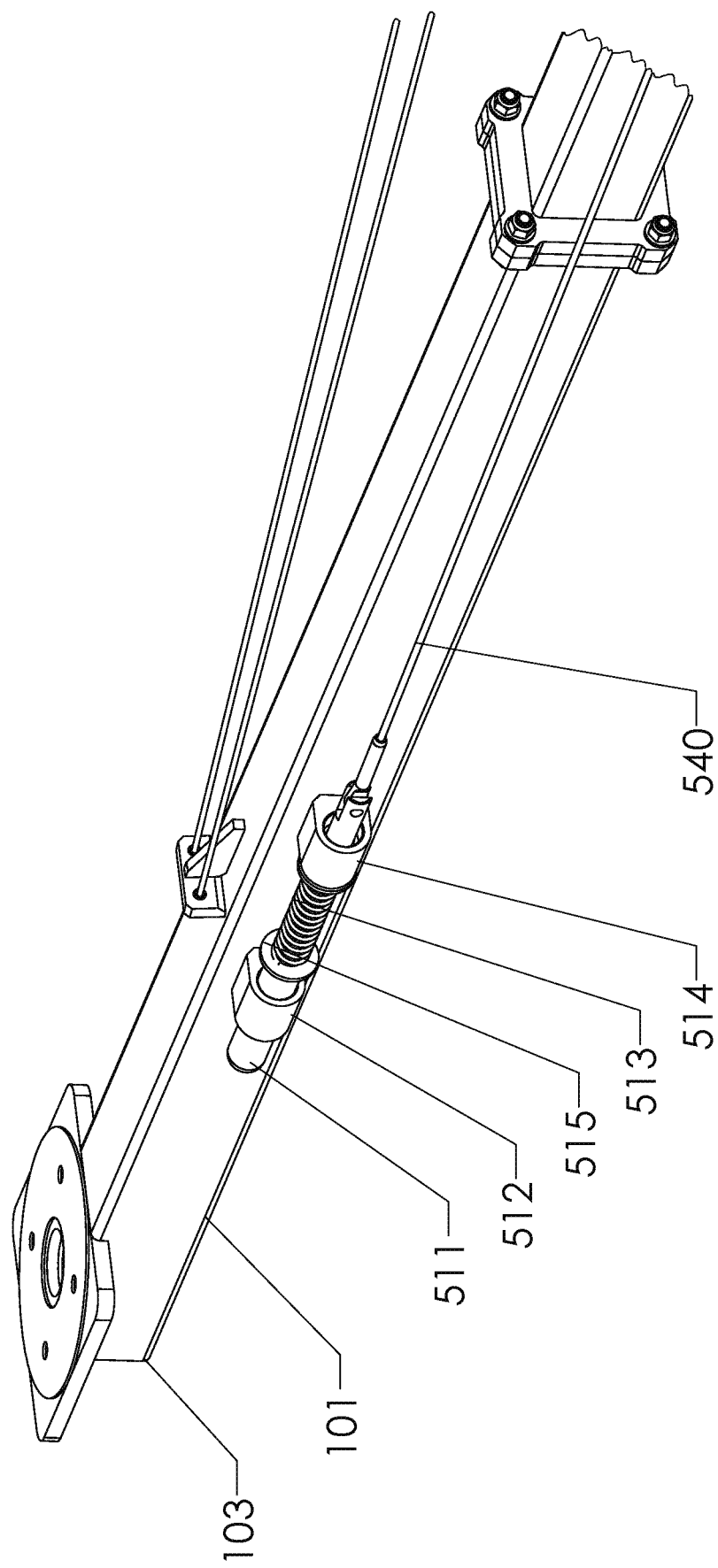
Figure 4C:
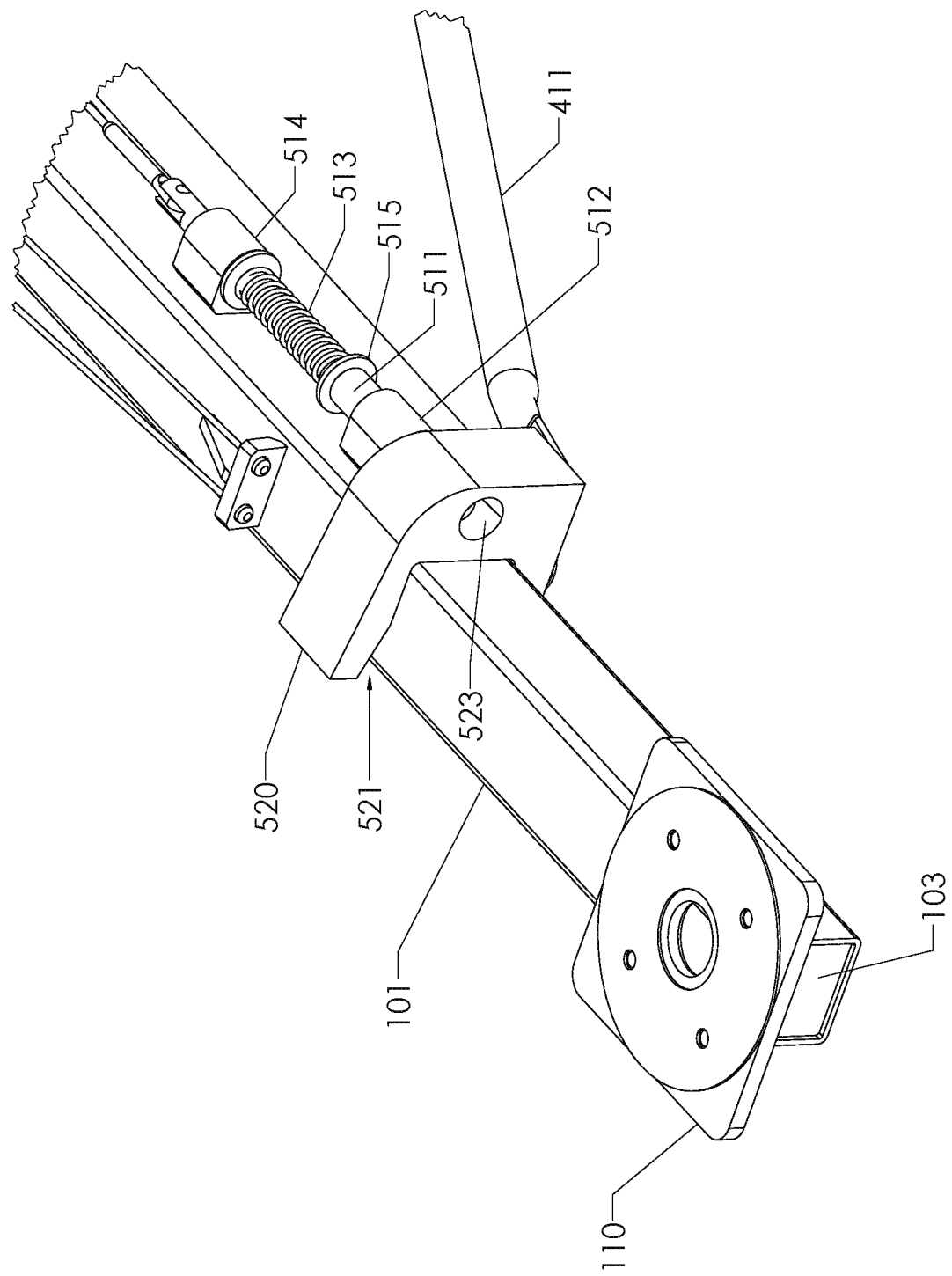
Figure 4E:
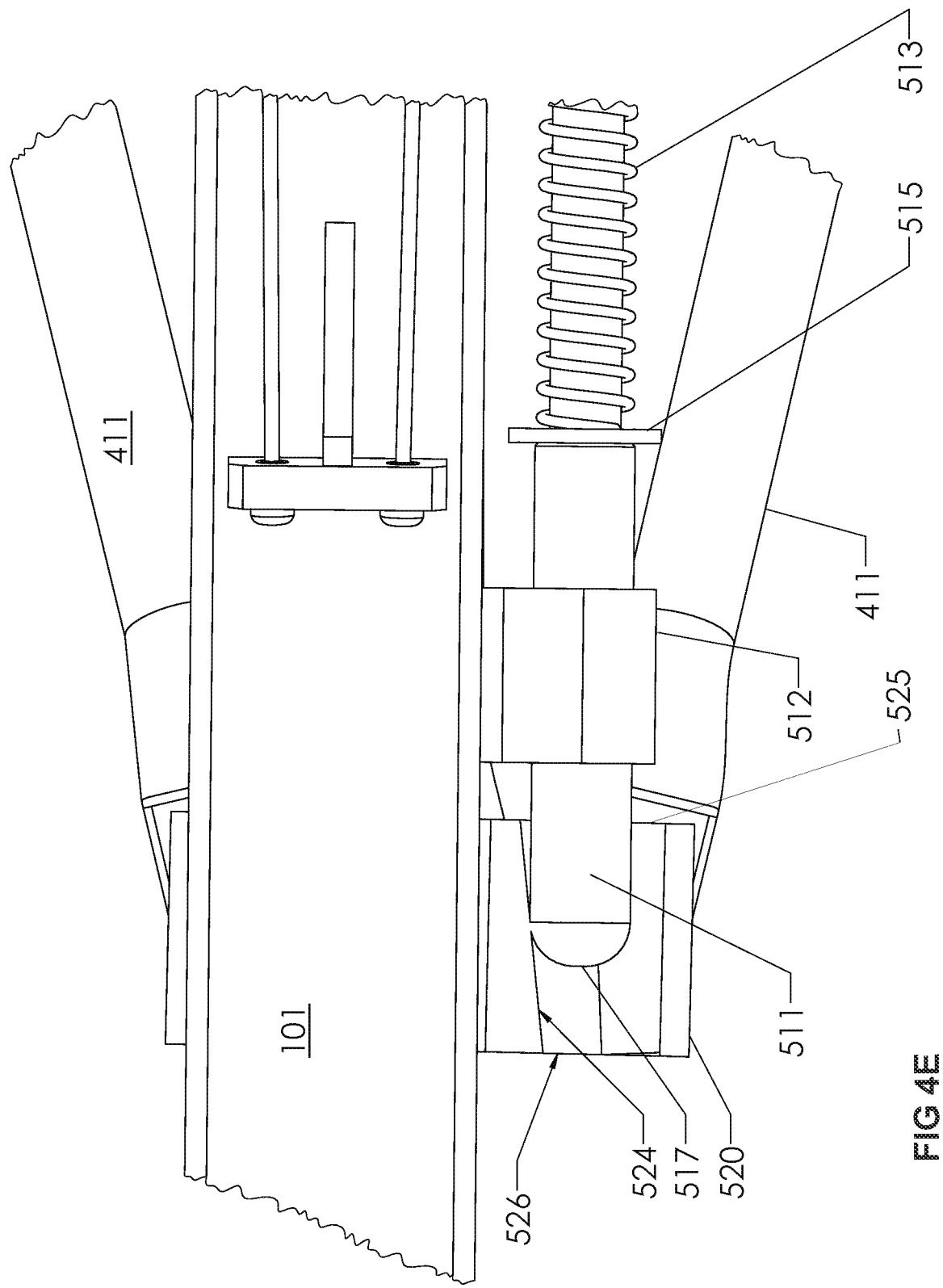

The beam 100 is supported by a support frame 400, as seen in FIGS. 1A-1E. Preferably, both the first portion 101 and the second portion 102 are supported by the support frame 400. The support frame 400 may include a first support arm 410 constructed to support the first portion 101 of the beam 100 (see also FIG. 3). The first support arm 410 terminates at a first support arm distal end 401. The support frame 400 may further include a second support arm 420 constructed to support the second portion 102 of the beam 100. The second support arm 420 terminates at a second support arm distal end 402. Both first and second support arms 410, 420 may include one or more lower support members 411, 412 extending from the base 300 to the support arm distal end 401, 402. Preferably, if individual support bars are used, at least two lower support members are included in both first and second support arms 410, 420 such that each lower support member attaches to the base 300 at a connection point 413 laterally distanced from one another in a direction perpendicular to the length L410, L420 of the support arm 410, 420. Both first and second support arms 410, 420 may include an upper support member 412, 422 extending from the post 200 to the support arm distal end 401, 402. The upper support members 412, 422 may attach to the post 200 at a connection point 414, 424 below the sleeve 105. The connection point 414, 424 may provide a downward stop for the sleeve 105 that prevents the sleeve 105 from sliding down on the post 200. A support collar 481 may be included on the post 200 above the support frame connection points 414, 424. The first support arm distal end 401 may include a support, such as a cradle 521, constructed to support the first portion 101 of the beam. The cradle 521 may be part of a latch block 520. The second support arm distal end 402 may include a support, such as a support bracket 444, constructed to support the second portion 102 of the beam. The support bracket 444 may also be shaped to have a concave cradle constructed to support the second portion 102 of the beam.

The beam 100 is held in a deployed position by latch assembly 500 that includes a releasable latch 510. The deployed position of the beam is the position in which the equipment is mounted in its intended operating location. For example, if the equipment is a security camera 600, the intended location may be at, near, or over the edge of the roof such that the security camera 600 can be pointed to a location adjacent the building. When the beam 100 is in its deployed position, the latch 510 (e.g., the latch pin 511) is in an engaged position. When the beam 100 is in its deployed position, the first portion 101 of the beam may be supported by the first support arm 410, and the second portion 102 of the beam may be supported by the second support arm 420.

Referring back to FIGS. 1A-1E, According to an embodiment, the latch assembly 500 includes a latch release 530, operably connected to the latch 510. The latch release 530 has a latch handle 531. The latch handle 531 is preferably positioned along the second portion 102 of the beam. Preferably, the latch handle 531 is positioned at a distance D531 from the post such that the handle can be manually operated at a distance of 6 ft (about 1.8 m) or greater from the roof edge.

According to an embodiment, the latch 510 includes a latch pin 511 and a latch block 520 constructed to receive and secure the latch pin 511. The latch release 530 may be connected to the latch pin 511 by a connector 540. The connector 540 may be a flexible or rigid member (e.g., a cable, wire, rod, or the like) that enables a pulling or pushing force to be transferred from the latch release 530 to the latch pin 511.

According to an embodiment, the latch pin 511 is located along the first portion 101 of the beam 100, and the latch block 520 is held stationary such that when the beam is rotated to its deployed position, the latch pin 511 may be received in the latch block 520, securing the first portion 101 of the beam 100 in place. For example, the latch block 520 may be attached to the first support arm 410. In an embodiment, the latch block 520 is conveniently located at the distal end 401 of the first support arm 410 such that the latch block 520 may be supported by the distal end 401 of the first support arm 410.

Figure 2A:
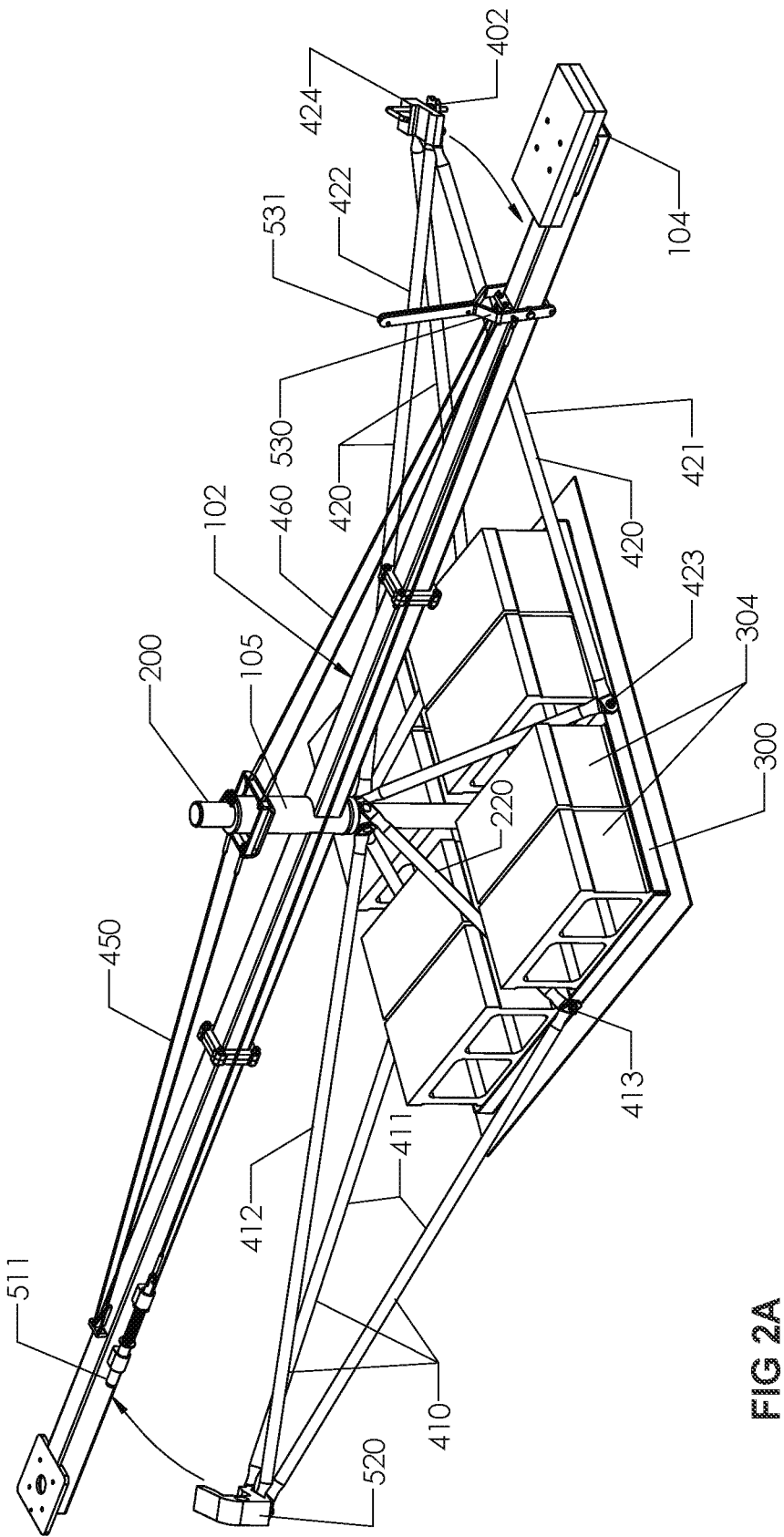
FIG. 2A is a perspective view of the mounting assembly of FIG. 1A in a partially rotated position according to an embodiment.
Figure 2B:
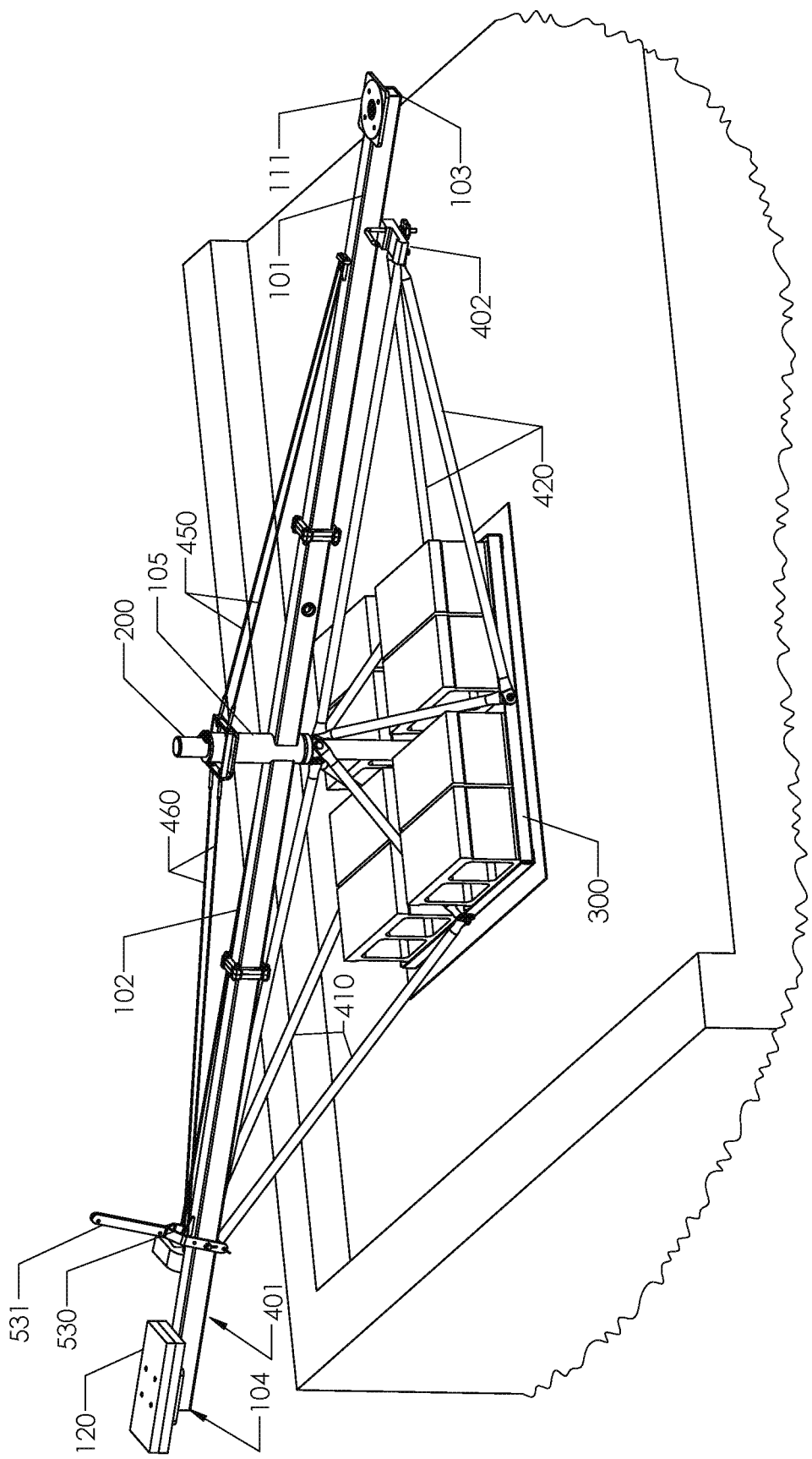
FIG. 2B is a perspective view of the mounting assembly of FIG. 1A in a maintenance position according to an embodiment.

When the latch 510 is released (e.g., by operating the latch release 530), the beam 100 can be rotated about the vertical axis A to a service position. Preferably the service position is such that the equipment can be serviced (e.g., manually handled) at a distance of 6 ft (about 1.8 m) or greater from the roof edge. Referring now to FIG. 2A, the beam 100 is shown in a partially rotated position. The latch pin 511 has been removed from the latch block 520 by operation of the latch release 530. The beam 100 may be further rotated to a service position, shown in FIG. 2B. In the service position the equipment end (first end 101) of the beam 100 may be at its furthest distance from the roof edge.

While the beam 100 is being rotated and while it is in the service position, the beam 100 is not supported by the first and second support arms 410, 420. The mounting assembly 1 may further include a tensionable support 450, 460 (e.g., a rod or a cable) that extends from the sleeve 105 toward the ends 101, 102 of the beam 100. The tensionable support 450, 460 may come under tension by the weight of the equipment and the counterweight, as needed, when the beam 100 is not otherwise supported. The tensionable support 450, 460 may be secured to the sleeve 105 by a center bracket 463. The tensionable support 450, 460 may be connected to the center bracket 463 by fasteners 451, 461. The tensionable support 450, 460 may be connected to the first and second portions 101, 102 of the beam by connectors 452, 462 (see FIGS. 6A and 8).

Referring now to FIGS. 4A-4D and 5A-5C, detailed views of the latch 510 are shown. The latch block 520 includes a latch pin hole 523 configured to receive the latch pin 511. In the embodiments shown, the latch pin 511 extends distally toward the end 103 of the first portion 101 of the beam 100, and is configured to enter the latch pin hole 523 from a proximal side of the latch block 520. However, other configurations are possible. The latch block 520 may also include a beam cradle 521 constructed to receive and support the beam 100.

The latch pin 511 is slidably mounted along the beam 100 using a guide block 512 and a spring block 514. The latch pin 511 may slide in the guide block 512 in a direction parallel to the length L101 of the first portion 101 of the beam. The latch 510 includes a compression spring 513 constructed to bias the latch pin 511 in a distal direction toward the first end 103 of the beam 100. The spring 513 may be tensioned between the spring block 514 and a flange 515 disposed along the latch pin 511. The proximal end 516 of the latch pin 511 is connected to a connector 540 that operably connects the latch pin 511 to the latch release 530. When a pulling force is applied to the latch pin 511 by the connector 540, the spring 513 is compressed between the flange 515 and the spring block 514, and the latch pin 511 is retracted from the latch pin hole 523 in the latch block. When the force is released, the compression spring 513 pushes the latch pin 511 distally, and the latch pin 511 (if aligned with the latch pin hole 523) may enter the latch pin hole 523, securing the beam 100 in place.

Referring now to FIGS. 4D, 4E, and 5A-5C, the latch pin hole 523 has an inside wall 524. The inside wall 524 has a proximal end 525 toward the post 200 and a distal end 526 toward the first end 401 of the support arm 410. According to an embodiment, at least a portion of the inside wall 524 is tapered toward the distal end 526 of the wall. That is, the cross sectional dimension D525 (e.g., width or diameter) at the proximal end 525 is greater than the cross sectional dimension D526 (e.g., width or diameter) at the distal end 526. The taper of the inside wall 524 may be characterized by the angle α of the wall relative to a center axis extending through the hole. The angle α may range from greater than 0° to 20°, from 2° to 15°, or from 4° to 10°. In one embodiment, the angle α is about 7°. The inside wall 524 may have a frustoconical shape. The latch pin hole 523 may be sized and positioned such that when the latch pin 511 is received in the latch pin hole 523, the distal end 517 of the latch pin 511 pushes against the tapered inside wall 524. This way, any vibration of the mounting assembly 1 will cause the latch pin 511 to be wedged tighter against the tapered inside wall 524 as the spring 513 continues to push the latch pin 511 distally, increasing the stability of the system.

Figure 6A:
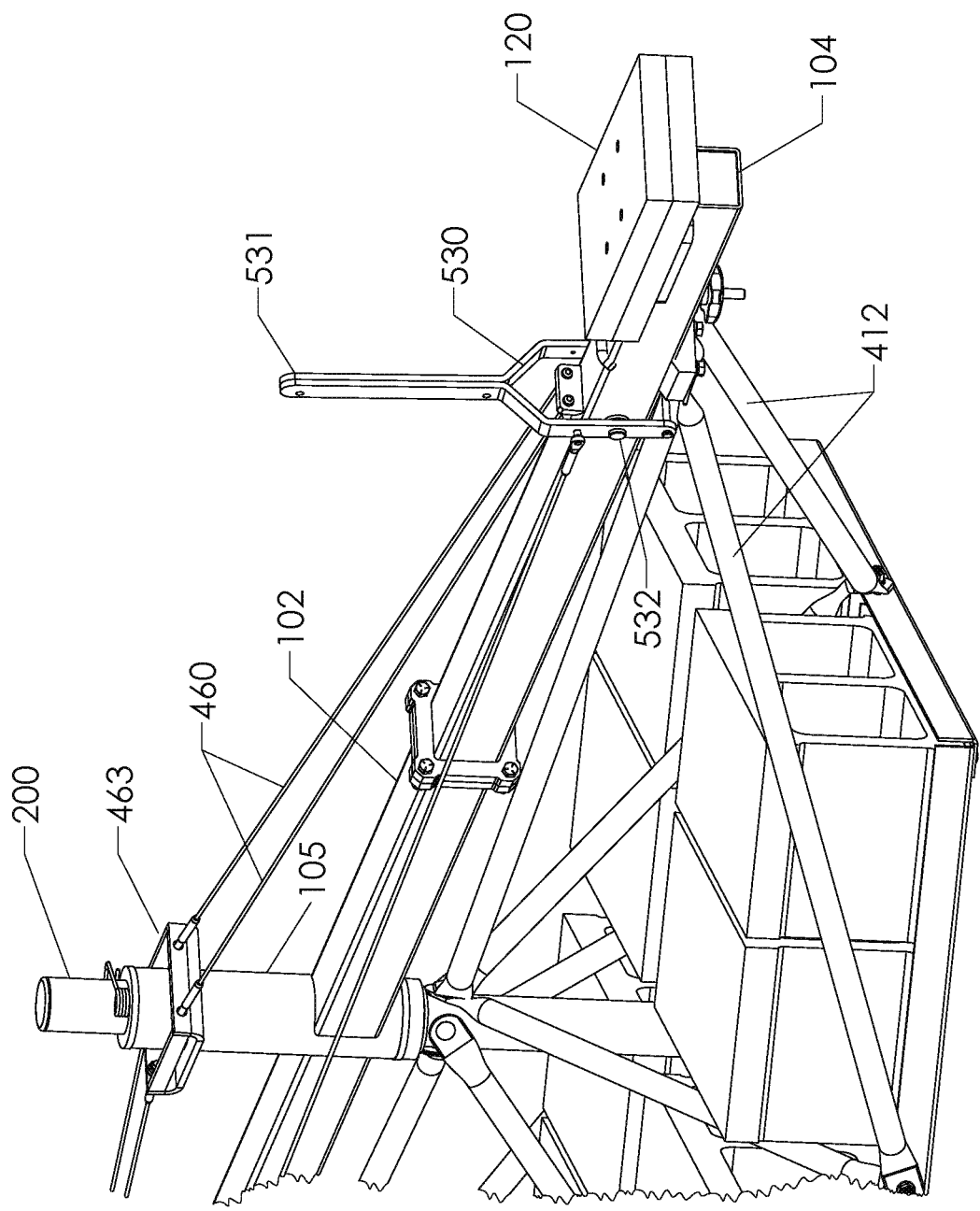
FIG. 6A is detail view of a latch release of the mounting assembly of FIG. 1 according to an embodiment.
Figure 6B:
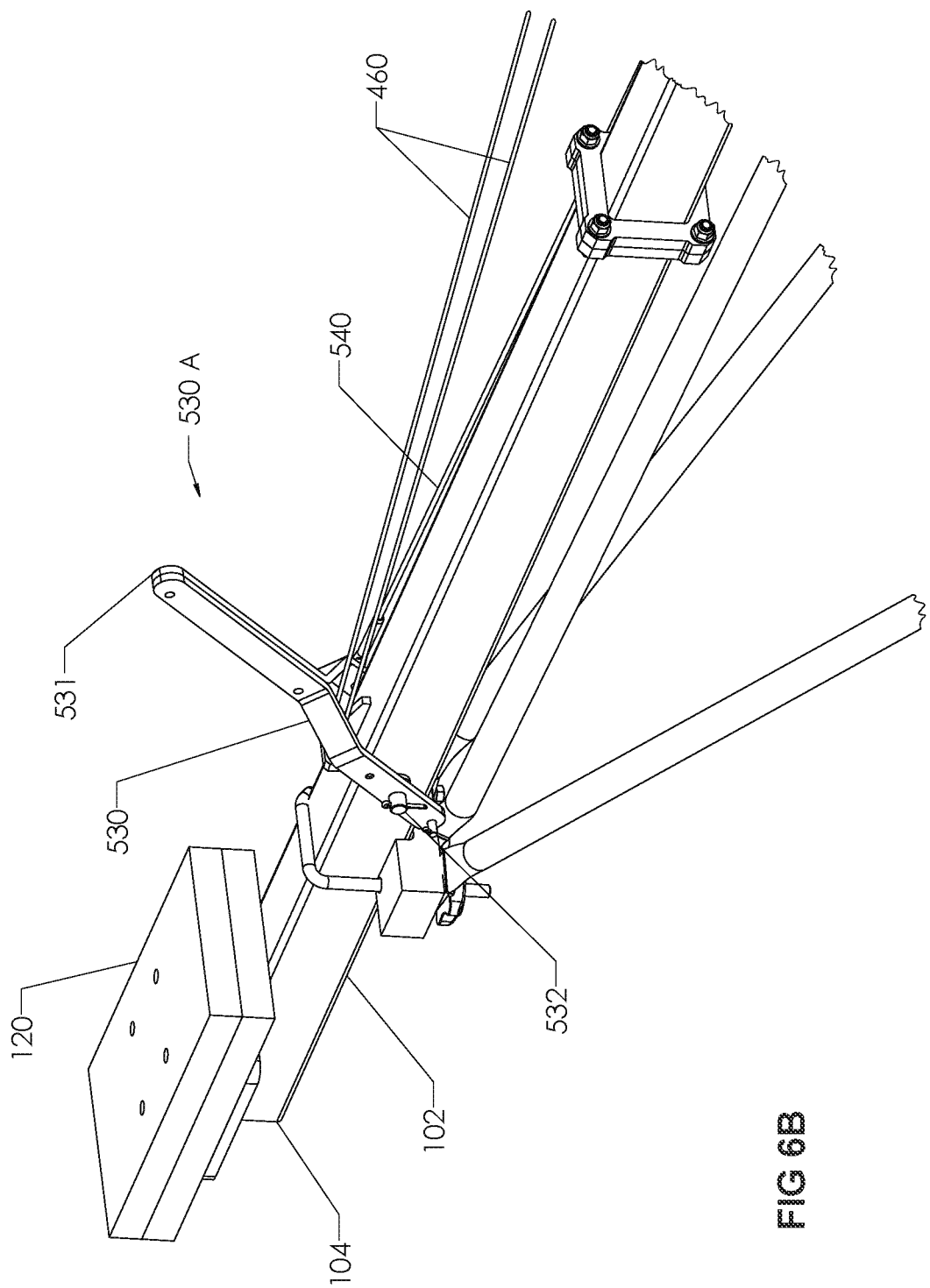
FIG. 6B is a perspective view of the latch release of FIG. 6A in an engaged position according to an embodiment.
Figure 6C:
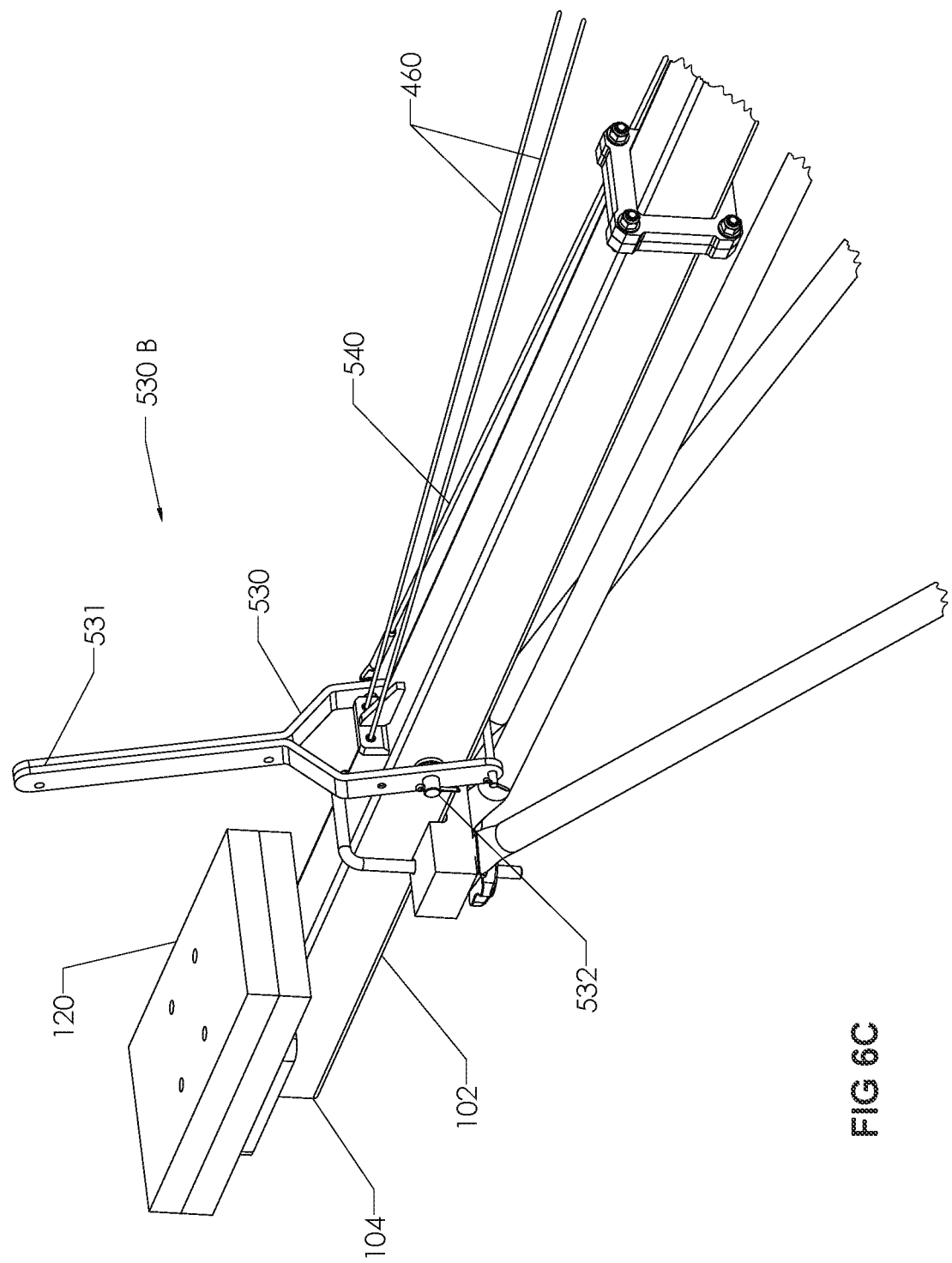
FIG. 6C is a perspective view of the latch release of FIG. 6A in a release position according to an embodiment.

Referring now to FIGS. 6A-6C, detailed views of the latch release 530 are shown. The latch release 530 includes a release handle 531 and a pivot point 532. When the release handle 531 is pushed or pulled, it pivots about the pivot point 532. The release handle 531 is connected to (e.g., operably coupled with) the connector 540, which in turn is connected to the latch pin 511. When the handle 531 is at rest, the latch pin 511 is held in its engaged position by the spring 513, and the latch release 530 is in an engaged position 530A, shown in FIG. 6B. Pulling or pushing on the release handle 531 will cause movement of the connector 540. In the configuration shown, the connector 540 is connected to the latch release 530 above the pivot point 532, and pulling on the handle 531 will pull on the connector 540. When the connector 540 is moved enough, the movement will effect the release of the latch pin 511 from the latch block 520, thus releasing the latch 510 and enabling the rotation of the beam 100. When the latch release 530 is actuated, the latch release is in a release position 530B, shown in FIG. 6C. Once the beam 100 has rotated away from the latch block 520 a few degrees, the release handle 531 may be released, allowing the latch pin 511 to position itself in a forward (distal) position under the force of the spring.

The latch release 530 is shown located at or near the connection point for the tensionable support 460. However, the latch release 530 may be located anywhere along the second portion 102 of the beam, so long as the handle can be manipulated from a distance of 6 ft (about 1.8 m) or greater from the roof edge when the beam 100 is in the deployed position. Further, the latch release 530 should be located so that the tensionable support 460 and the support arm 420 do not interfere with the operation of the latch release 530. While the mounting assembly 1 is shown with a latch release handle 531 that can be pushed or pulled, other types of actuators may also be used.

In an alternative embodiment, the latch assembly 500 includes a motorized release system. The motorized releases system may include, for example, a geared motor and a screw constructed to engage and release the latch 510.

Figure 7:
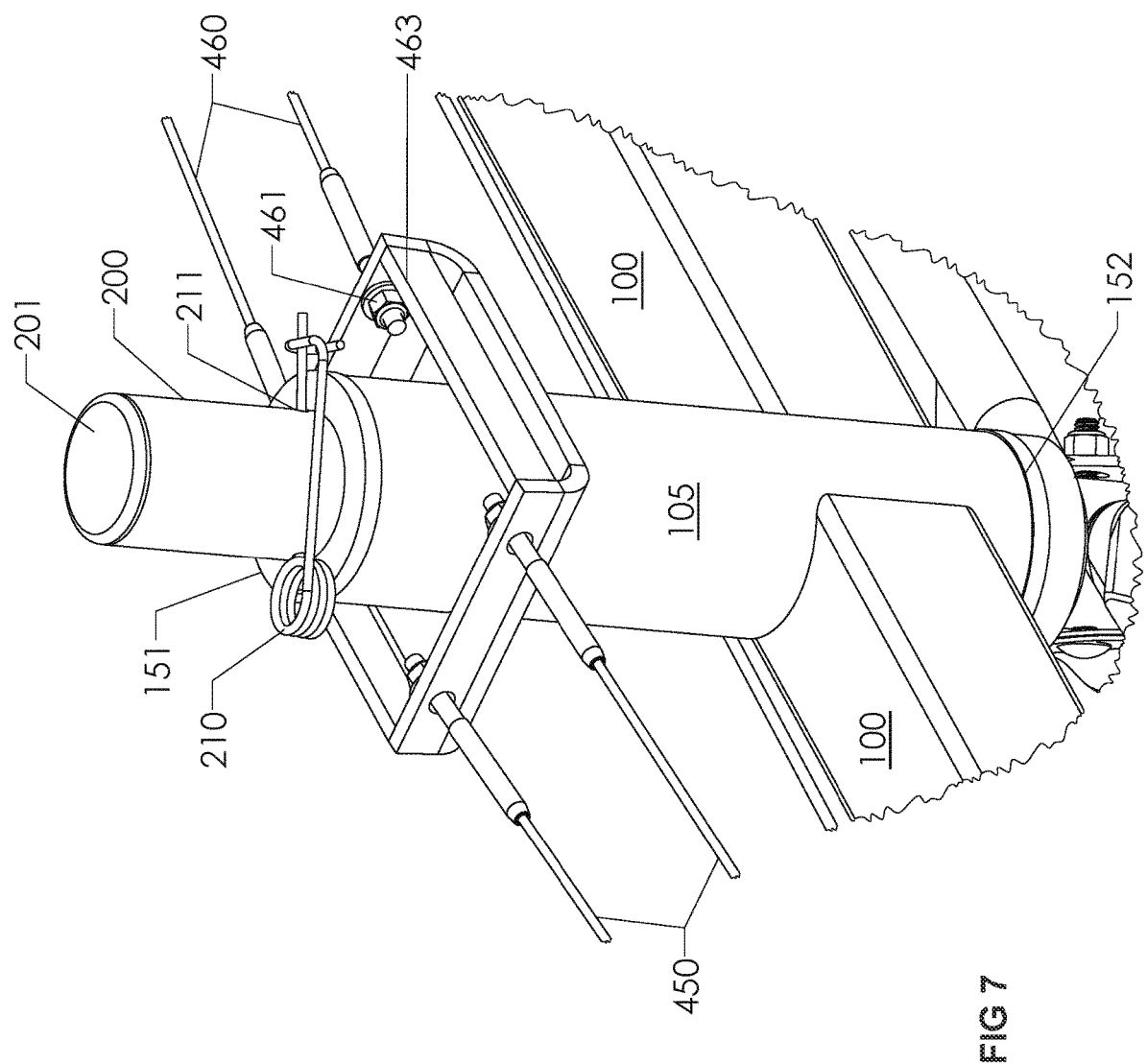
FIG. 7 is a detail view of a post and sleeve of the mounting assembly of FIG. 1 according to an embodiment.

The beam assembly and tensionable support 450, 460 may be secured in place by a retainer 210, as shown in FIG. 7. In the embodiment shown, the retainer 210 is a pin extending through a hole 211 in the post 200, above the upper end 151 of the sleeve 105. Thus, the sleeve 105 is captured between the support frame connection points 414, 424 below the lower end 152 of the sleeve 105, and the retainer 210 above the upper end 151 of the sleeve 105.

The mounting assembly 1 may include additional parts to facilitate assembly, transport, maintenance, and/or free movement of the moving parts. For example, the post 200 and/or the sleeve 105 may include bearings. A support collar or ring may be include at the bottom and/or top of the sleeve 105. For example, a support collar 481 may be included between the support frame connection points 414, 424 and the lower end 152 of the sleeve 105. A collar or ring may also be included above the upper end 151 of the sleeve 105, below the retainer 210.

A method of using the mounting assembly 1 may include mounting a piece of equipment (e.g., a security camera 600) on the equipment mounting bracket 110 and rotating the beam 100 about the vertical axis A until the beam 100 is received in the cradle 521 and the latch pin 511 can be received in the latch pin hole 523. The latch handle 531 may be pushed and/or pulled to ensure that the latch pin 511 is received in the latch pin hole 523. A method of accessing the equipment mounted on the mounting assembly may include actuating the latch release 530 such that the latch moves from the engaged position to the release position. Actuating the latch release 530 may include pushing or pulling on the latch handle 531. Actuating the latch release 530 causes the latch pin 511 to recede from the latch pin hole 523 in the latch block 520. The method may further include rotating the beam such that the equipment is accessible from a safe distance from the roof edge (e.g., greater than 6 feet or about 1.8 m). The beam may be rotated about the vertical axis by 120° to 240°, 130° to 230°, 140° to 220°, 150° to 210°, 160° to 200°, or 170° to 190°. In the embodiment shown, the beam may be rotated about the vertical axis by about 170° to 180°.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. It should be understood that this disclosure is not intended to be unduly limited by the illustrative embodiments and examples set forth herein and that such examples and embodiments are presented by way of example only with the scope of the disclosure intended to be limited only by the claims set forth here.

The invention claimed is:

1. A mounting assembly comprising:
   a base;
   a post extending from the base, the post defining a vertical axis extending along a length of the post;
   a beam mounted on the post and being pivotable about the vertical axis, the beam comprising a first portion extending in a first horizontal direction from the post and terminating in a first end, and a second portion extending in a second horizontal direction opposite of the first direction and terminating in a second end;
   an equipment mounting bracket at the first end;
   a latch mounted along the first portion of the beam, the latch having an engaged position and a release position, wherein in the engaged position the latch prevents the beam from pivoting; and
   a latch release along the second portion of the beam.

2. The mounting assembly of claim 1, wherein the latch is remotely releasable and engageable.

3. The mounting assembly of claim 1, wherein the latch comprises a latch pin and a latch block comprising a hole constructed to receive the latch pin.

4. The mounting assembly of claim 3, wherein the hole has a first cross-sectional dimension proximal to the post and a second cross-sectional dimension distal to the post, and wherein the second cross-sectional dimension is smaller than the first cross-sectional dimension.

5. The mounting assembly of claim 3, wherein the hole comprises a frustoconical inner surface.

6. The mounting assembly of claim 1, wherein the latch comprises a spring biased toward the first end of the beam and toward an engaged position.

7. The mounting assembly of claim 3, wherein the latch block is mounted at a distal end of a support frame.

8. The mounting assembly of claim 1, wherein the latch release comprises a latch handle pivotably attached to the second portion of the beam.

9. The mounting assembly of claim 1, wherein the latch release is connected to a latch pin by a cable or rod.

10. The mounting assembly of claim 1, wherein the second portion is constructed to support a counterweight.

11. The mounting assembly of claim 1, wherein the base is constructed to accept a ballast.

12. The mounting assembly of claim 1 further comprising a support frame constructed to support the beam when the latch is in the engaged position.

13. The mounting assembly of claim 12, wherein the support frame comprises a first support arm constructed to support the first portion of the beam.

14. The mounting assembly of claim 13, wherein the first support arm comprises a latch block.

15. The mounting assembly of claim 12, wherein the support frame comprises a second support arm constructed to support the second portion of the beam.

16. The mounting assembly of claim 12, wherein the support frame comprises a first support arm and a second support arm, both first and second support arms comprising a support member extending from a sleeve at least partially surrounding the post to a support arm distal end and one or more support members extending from the base to the support arm distal end.

17. The mounting assembly of claim 1 further comprising a tensionable support cable extending from a sleeve at least partially surrounding the post toward the first end of the beam.

18. The mounting assembly of claim 1, wherein the beam is coupled with the post via a sleeve at least partially surrounding the post.

19. A method of accessing equipment mounted on the mounting assembly of any one of the preceding claims, the method comprising:
   actuating the latch release such that the latch moves from the engaged position to the release position; and
   rotating the beam about the vertical axis by 150° to 210°.

20. A mounting assembly comprising:
   a base;
   a post extending from the base, the post defining a vertical axis extending along a length of the post;
   a beam mounted on the post and being pivotable about the vertical axis, the beam comprising a first portion extending in a first horizontal direction from the post and terminating in a first end, and a second portion extending in a second horizontal direction opposite of the first direction and terminating in a second end;
   an equipment mounting bracket at the first end;
   a latch along the beam, the latch having an engaged position and a release position, wherein in the engaged position the latch prevents the beam from pivoting; and
   a latch release along the second portion of the beam,
   wherein the latch comprises a latch pin and a latch block comprising a hole constructed to receive the latch pin, and wherein the hole has a first cross-sectional dimension proximal to the post and a second cross-sectional dimension distal to the post, and wherein the second cross-sectional dimension is smaller than the first cross-sectional dimension.

21. The mounting assembly of claim 20, wherein the latch is mounted along the first portion of the beam.

* * * * *